(12) United States Patent
Foskey et al.

(10) Patent No.: US 10,239,604 B2
(45) Date of Patent: Mar. 26, 2019

(54) STRUCTURALLY BIASED PROPROTOR BLADE ASSEMBLY

(71) Applicant: Bell Helicopter Textron Inc., Fort Worth, TX (US)

(72) Inventors: Christopher Foskey, Fort Worth, TX (US); Michael Burnett, Fort Worth, TX (US); Jeffrey Bosworth, Fort Worth, TX (US); Jared Mark Paulson, Fort Worth, TX (US); Joel McIntyre, Fort Worth, TX (US); Paul K. Oldroyd, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 322 days.

(21) Appl. No.: 15/161,215

(22) Filed: May 21, 2016

(65) Prior Publication Data

US 2017/0334548 A1 Nov. 23, 2017

(51) Int. Cl.
*B64C 11/26* (2006.01)
*B64C 29/00* (2006.01)
*B64C 11/24* (2006.01)
*B64C 27/473* (2006.01)

(52) U.S. Cl.
CPC .............. *B64C 11/26* (2013.01); *B64C 11/24* (2013.01); *B64C 27/473* (2013.01); *B64C 29/0033* (2013.01); *B64C 2027/4736* (2013.01)

(58) Field of Classification Search
CPC ....... B64C 11/26; B64C 27/473; B64C 11/24; B64C 29/0033; B64C 2027/4736
See application file for complete search history.

(56) References Cited

U.S. PATENT DOCUMENTS 3,829,240 A * 8/1974 Edenborough ......... B64C 27/46
416/223 R
3,967,996 A * 7/1976 Kamov .................. B23P 15/04
156/156
4,095,322 A * 6/1978 Scarpati ................ B29C 70/345
156/182

(Continued)

FOREIGN PATENT DOCUMENTS

GB 2148820 B 3/1987
WO 1996006776 A1 3/1996
WO 2004067380 A1 8/2004

OTHER PUBLICATIONS

European Examination Report, Application No. 16174779.5, EPO, dated Jul. 7, 2017.

(Continued)

*Primary Examiner* — Valentina Xavier
(74) *Attorney, Agent, or Firm* — Lawrence Youst PLLC

(57) ABSTRACT

A tiltrotor aircraft includes a fuselage, a wing member extending from the fuselage, an engine disposed relative to the wing member and a proprotor mechanically coupled to the engine. The proprotor includes a plurality of proprotor blade assemblies each including a spar and a sheath extending spanwise along the spar forming the leading edge of the proprotor blade assembly. The spar has a root section, a main section and a tip section. The spar has a generally oval cross section at radial stations along the main section and a first edge having a structural bias relative to a generally oppositely disposed second edge at the radial stations along the main section.

20 Claims, 7 Drawing Sheets

(56) References Cited

U.S. PATENT DOCUMENTS

| | | | | |
|---|---|---|---|---|
| 5,222,297 | A * | 6/1993 | Graff | B29C 70/865 |
| | | | | 29/889.7 |
| 5,542,820 | A * | 8/1996 | Eaton | B64C 27/473 |
| | | | | 416/224 |
| 7,594,625 | B2 | 9/2009 | Robertson et al. | |
| 8,353,673 | B2 * | 1/2013 | Leahy | B64C 27/463 |
| | | | | 416/210 R |
| 9,174,731 | B2 | 11/2015 | Ross et al. | |
| 2005/0013694 | A1 * | 1/2005 | Kovalsky | B64C 27/46 |
| | | | | 416/226 |
| 2005/0254947 | A1 * | 11/2005 | Loftus | B64C 27/008 |
| | | | | 416/144 |
| 2006/0239824 | A1 * | 10/2006 | Robertson | B64C 11/16 |
| | | | | 416/231 B |
| 2014/0133993 | A1 * | 5/2014 | Gill, III | B64C 27/008 |
| | | | | 416/223 A |
| 2015/0030458 | A1 | 1/2015 | Nissen | |
| 2015/0082634 | A1 * | 3/2015 | Leahy | B64C 27/008 |
| | | | | 29/889.71 |
| 2015/0232175 | A1 | 8/2015 | Kizhakkepat et al. | |
| 2017/0369662 | A1 * | 12/2017 | Emmerson | C08J 5/24 |

OTHER PUBLICATIONS

European Search Report, Application No. 16174779.5, EPO, dated Jun. 6, 2017.
Canadian Examination Report, Application No. 2,967,974, CIPO, dated Sep. 13, 2018.

* cited by examiner

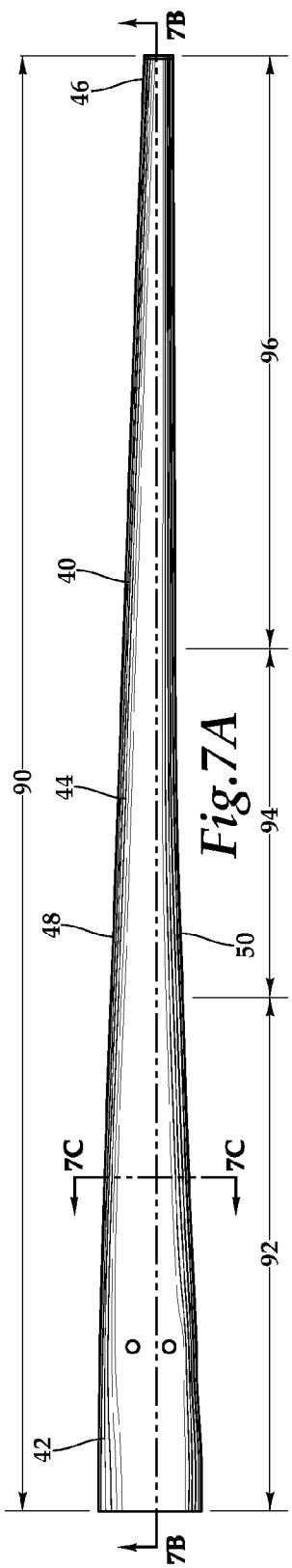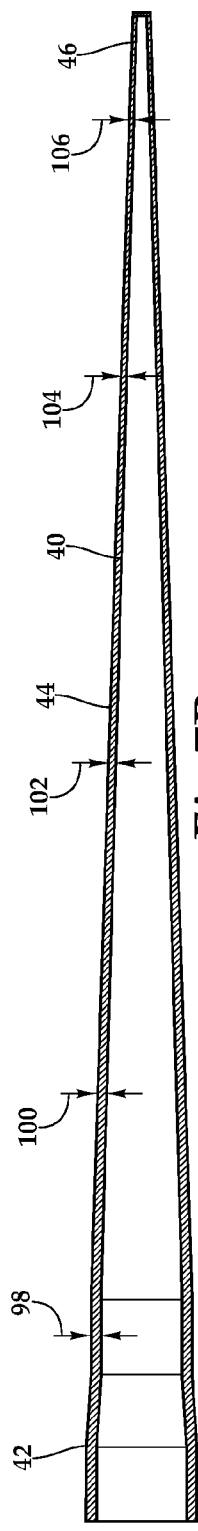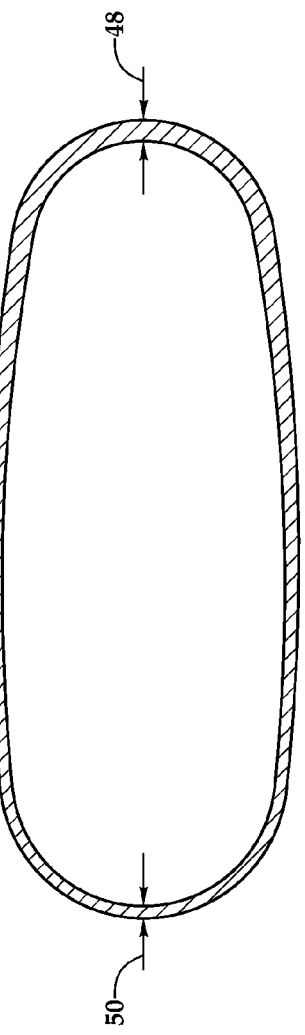

STRUCTURALLY BIASED PROPROTOR BLADE ASSEMBLY

TECHNICAL FIELD OF THE DISCLOSURE

The present disclosure relates, in general, to a rotor blade assembly operable for use on a rotorcraft and, in particular, to a structurally biased proprotor blade assembly operable for use on a tiltrotor aircraft.

BACKGROUND

Tiltrotor aircraft typically include multiple rotor assemblies that are carried by the wing member of the aircraft and are generally disposed near the end portions of the wing member. Each rotor assembly may include an engine and transmission that provide torque and rotational energy to a drive shaft that rotates a proprotor including a plurality of proprotor blade assemblies. Typically, the rotor assemblies are capable of moving or rotating relative to the wing member enabling the tiltrotor aircraft to operate between a helicopter mode, in which the rotor assemblies are tilted upward, such that the tiltrotor aircraft flies much like a conventional helicopter and an airplane mode, in which the rotor assemblies are tilted forward, such that the tiltrotor aircraft flies much like a conventional propeller driven aircraft. In this manner, the proprotors generate greater lift in helicopter mode than in airplane mode, as the proprotors are oriented to generate greater thrust propelling the aircraft vertically. Likewise, the proprotors generate greater forward speed in airplane mode than in helicopter mode, as the proprotors are oriented to generate greater thrust propelling the aircraft forward.

In conventional tiltrotor aircraft, the proprotor blade assemblies include a D-shaped spar having the bulk of its structure biased forward, offering favorable structural coupling and mass properties. Unfortunately, D-shaped spars are structurally complex having tight internal radii and complicated material transitions resulting in a component that is particularly difficult, time consuming and expensive to manufacture. Accordingly, a need has arisen for an improved proprotor blade assembly having a spar with a less complex structure that is simpler, less expensive and less time consuming to manufacture.

SUMMARY

In a first aspect, the present disclosure is directed to a proprotor blade assembly. The proprotor blade assembly includes a spar and a sheath extending spanwise along a leading edge of the spar. The spar has a root section, a main section and a tip section. The spar has a generally oval cross section at radial stations along the main section. The spar has a first edge and a generally oppositely disposed second edge, wherein the first edge has a structural bias relative to the second edge at the radial stations along the main section.

In certain embodiments, the first edge of the spar may be the leading edge of the spar. In some embodiments, the thickness of the first edge of the spar is greater than the thickness of the second edge of the spar at the radial stations along the main section of the spar. For example, the thickness of the first edge of the spar may be at least 50% greater than the thickness of the second edge of the spar at the radial stations along the main section of the spar. As another example, the thickness of the first edge of the spar may be between about 50% and about 120% greater than the thickness of the second edge of the spar at the radial stations along the main section of the spar.

In certain embodiments, the first edge of the spar may be a cured laminate of overlapping broad goods layers. For example, the overlapping broad goods layers may extend between about 180 degrees and about 290 degrees around the spar. In some embodiments, the second edge of the spar may be a cured laminate of butt-spliced broad goods layers including, for example, staggered butt-spliced broad goods layers. In certain embodiments, the spar may be a monolithic structure formed by curing a plurality of composite broad goods material layers such as fiberglass fabric, carbon fabric, fiberglass tape, carbon tape and combinations thereof.

In some embodiments, the spar may have simple geometric surfaces with smooth transitions. In certain embodiments, the sheath may extend along the full span of the spar. In some embodiments, the sheath may be a structural member of the proprotor blade assembly. Some embodiments of the proprotor blade assembly may include a filler assembly disposed between the spar and the sheath, a core member and wedge member extending spanwise along the trailing edge of the spar and/or an upper skin and a lower skin each extending spanwise along the spar forming upper and lower surfaces of the proprotor blade assembly. In certain embodiments, the root section of the spar may include an integral cuff that may provide redundant centrifugal force retention load paths for the spar.

In a second aspect, the present disclosure is directed to a tiltrotor aircraft. The tiltrotor aircraft includes a fuselage, a wing member extending from the fuselage, an engine disposed relative to the wing member and a proprotor mechanically coupled to the engine. The proprotor includes a plurality of proprotor blade assemblies each including a spar and a sheath extending spanwise along a leading edge of the spar. The spar has a root section, a main section and a tip section. The spar has a generally oval cross section at radial stations along the main section. The spar has a first edge and a generally oppositely disposed second edge, wherein the first edge has a structural bias relative to the second edge at the radial stations along the main section. In certain embodiments, the engine may be rotatably mounted relative to the wing member.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIG. 7A is a top view of a spar for use in a proprotor blade assembly in accordance with embodiments of the present disclosure;

FIG. 7B is a cross sectional view of the spar in FIG. 7A taken along line 7B-7B;

FIG. 7C is a cross sectional view of the spar in FIG. 7A taken along line 7C-7C.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
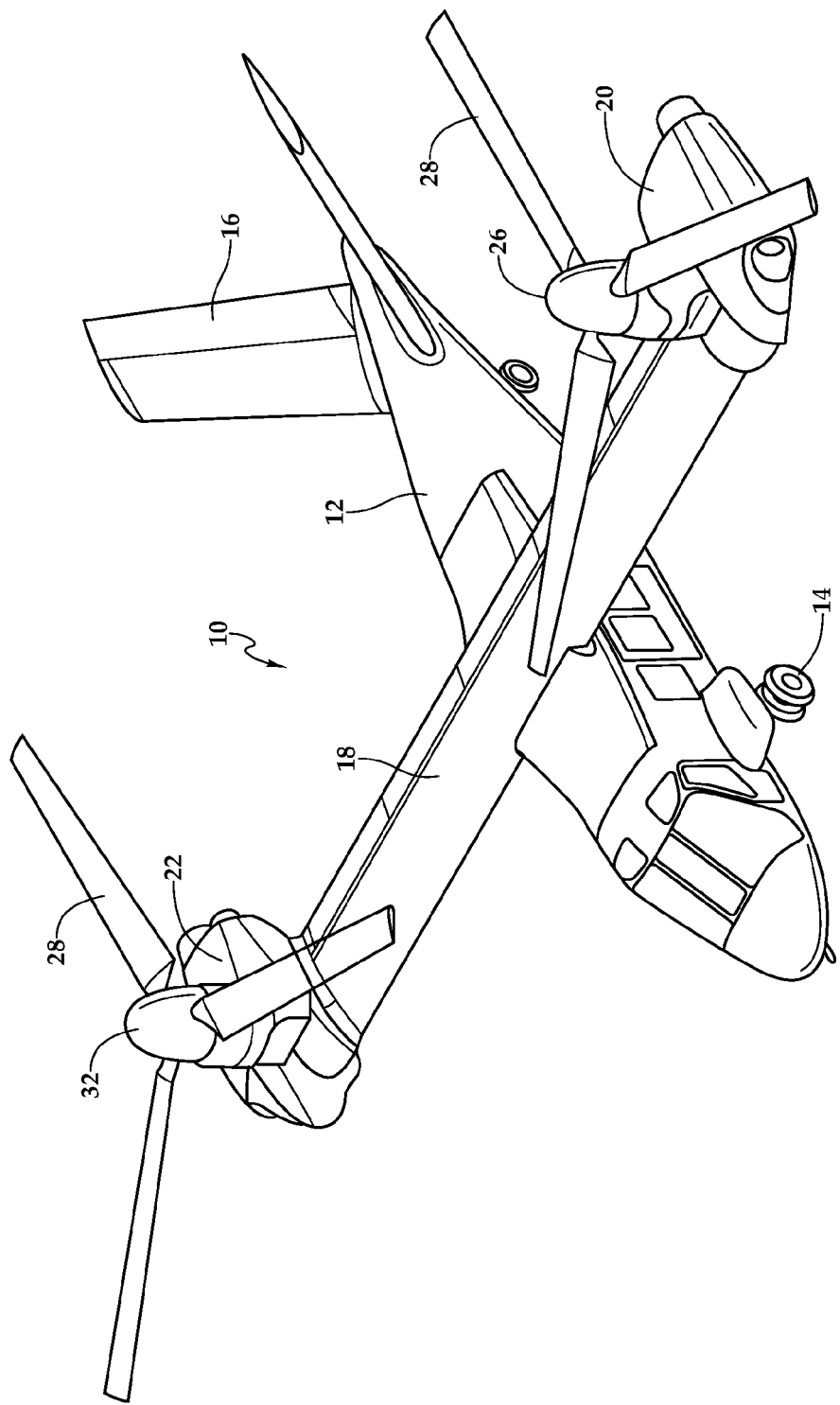
FIG. 1 is a schematic illustration of an exemplary tiltrotor aircraft in helicopter mode in accordance with embodiments of the present disclosure.
Figure 2:
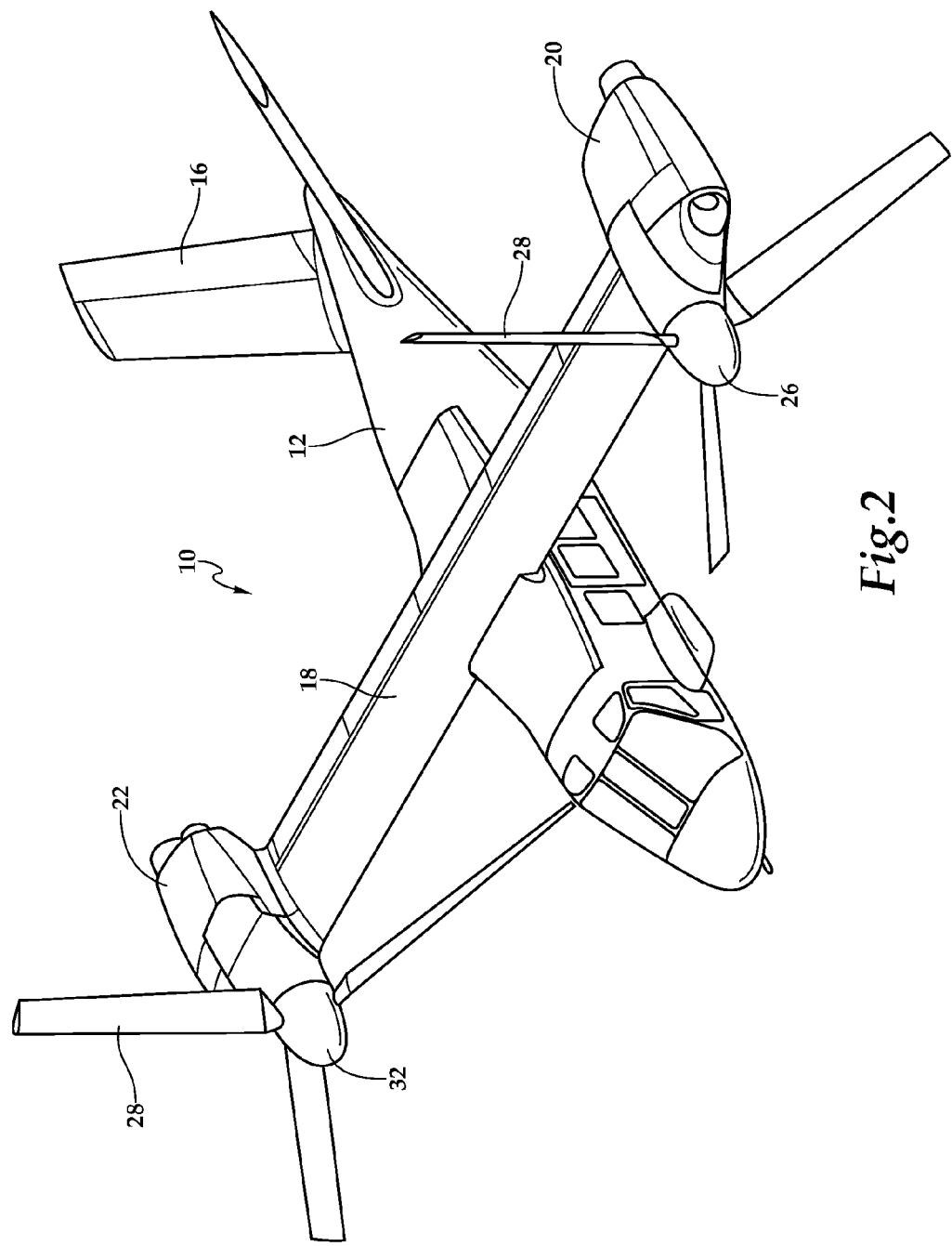
FIG. 2 is a schematic illustration of an exemplary tiltrotor aircraft in airplane mode in accordance with embodiments of the present disclosure.

Referring to FIGS. 1-2 in the drawings, a tiltrotor aircraft 10 is schematically illustrated. Tiltrotor aircraft 10 includes a fuselage 12, a landing gear 14, a tail member 16, a wing member 18 and propulsion systems 20, 22. Propulsion system 20 includes a fixed engine and a transmission that provide torque and rotational energy to a drive shaft that is operably coupled to a rotatable proprotor 26 including a plurality of proprotor blade assemblies 28. Likewise, propulsion system 22 includes a fixed engine and a transmission that provide torque and rotational energy to a drive shaft that is operably coupled to a rotatable proprotor 32 including a plurality of proprotor blade assemblies 28. The position of rotatable proprotors 26, 32 as well as the pitch of proprotor blade assemblies 28, is determined using a flight control system to selectively control the direction, thrust and lift of tiltrotor aircraft 10.

FIG. 1 illustrates tiltrotor aircraft 10 in helicopter mode, in which rotatable proprotors 26, 32 are positioned substantially vertical to provide a lifting thrust, such that tiltrotor aircraft 10 flies much like a conventional helicopter. FIG. 2 illustrates tiltrotor aircraft 10 in airplane mode, in which rotatable proprotors 26, 32 are positioned substantially horizontal to provide a forward thrust in which a lifting force is supplied by wing member 18, such that tiltrotor aircraft 10 flies much like a conventional propeller driven aircraft. It should be appreciated that tiltrotor aircraft 10 can be operated such that rotatable proprotors 26, 32 are selectively positioned between airplane mode and helicopter mode, which can be referred to as a conversion mode. Even though proprotor blade assemblies 28 of the present disclosure have been illustrated in the context of tiltrotor aircraft 10, it should be understood by those skilled in the art that proprotor blade assemblies 28 can be implemented in a variety of ways on a variety of rotorcraft including, for example, tiltwing aircraft, quad tiltrotor aircraft, unmanned aircraft and the like. As such, those skilled in the art will recognize that proprotor blade assemblies 28 can be integrated into a variety of rotorcraft configurations.

Figure 3:
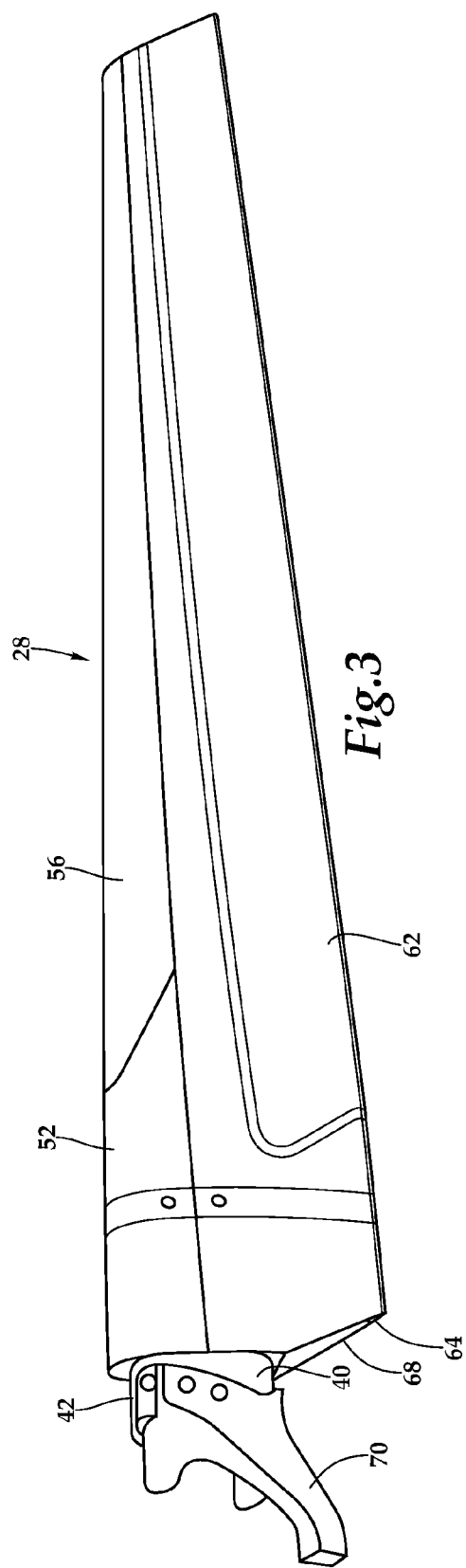
FIG. 3 is a top view of a proprotor blade assembly in accordance with embodiments of the present disclosure.
Figure 4:
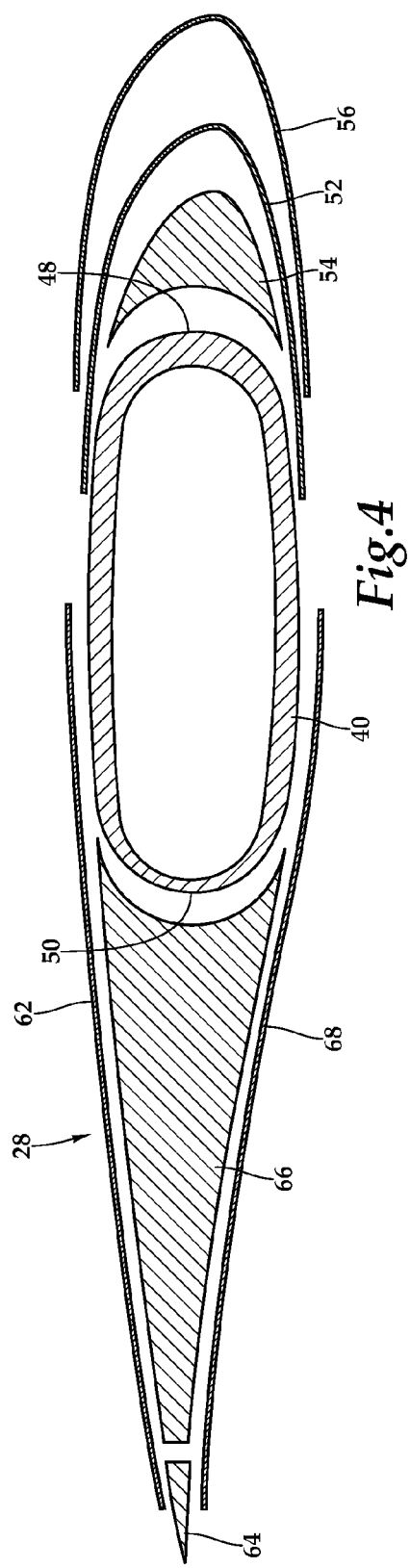
FIG. 4 is an exploded cross sectional view of a proprotor blade assembly in accordance with embodiments of the present disclosure.
Figure 5:
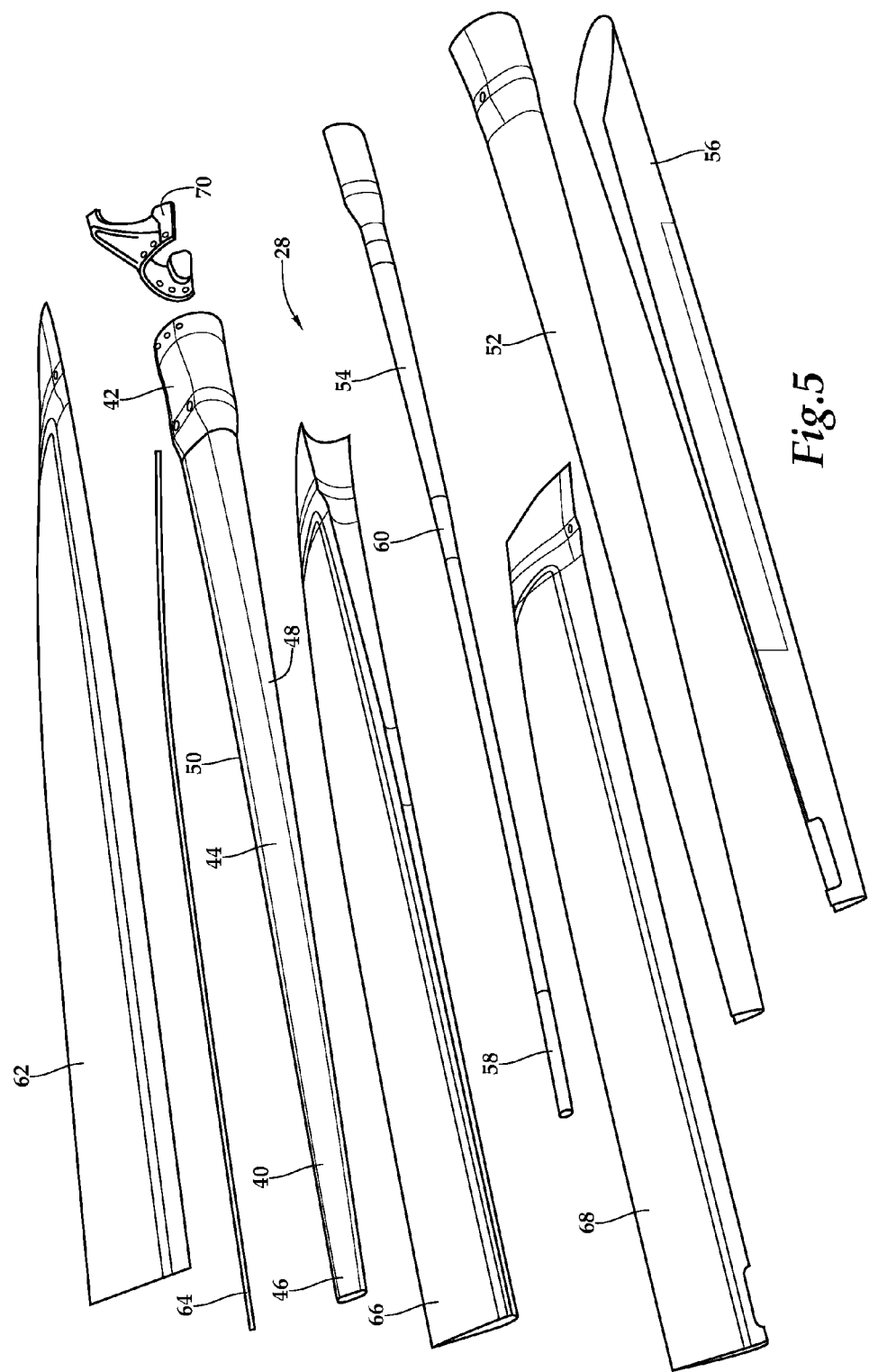
FIG. 5 is an exploded view of a proprotor blade assembly in accordance with embodiments of the present disclosure.

Referring to FIGS. 3-5 in the drawings, a proprotor blade assembly 28 is illustrated. Proprotor blade assembly 28 includes a spar 40 that is the main structural member of proprotor blade assembly 28 designed to carry the primary centrifugal and bending loads of proprotor blade assembly 28. Spar 40 has a root section 42, a main section 44, a tip section 46, a leading edge 48 and a trailing edge 50. As illustrated, spar 40 has a root-to-tip twist on the order of about 30 degrees to about 40 degrees and preferably about 35 degrees. As best seen in FIG. 4, spar 40 has a generally oval cross section along at least main section 44 of spar 40 such that the interior of spar 40 has simple geometric surfaces with smooth transitions between the forward wall 48, the upper and lower walls and the aft wall 50. Spar 40 is preferably a monolithic structure formed using a broad goods and/or layered tape construction process having a manual or automated layup of a plurality of composite broad goods material layers such as fiberglass fabric, carbon fabric, fiberglass tape, carbon tape and combinations thereof, positioned over one or more mandrels having simple geometric surfaces with smooth transitions. After curing, the material layers form a high strength, lightweight solid composite member. As discussed in detail below, spar 40 has a forward structural bias. This is achieved by tailoring the material thickness along forward wall or leading edge 48 to be greater than the material thickness along aft wall or trailing edge 50 of spar 40. This results in the shear center, the weight and the stiffness of spar 40 being biased forward.

A discrete sheath 52, an optional foam filler 54 and an abrasion resistant strip 56 form the leading edge of proprotor blade assembly 28. As illustrated, sheath 52 has a generally C-shaped cross section and is securably attached spanwise to spar 40 using adhesive, curing or other suitable coupling technique. Sheath 52 is preferably a monolithic structure formed using a broad goods and/or layered tape construction process having a manual or automated layup of a plurality of composite broad goods material layers such as fiberglass fabric, carbon fabric, fiberglass tape, carbon tape and combinations thereof. After curing, the material layers form a high strength, lightweight solid composite member. Sheath 52 serves as a structural member of proprotor blade assembly 28 including providing shear stiffness to proprotor blade assembly 28. In addition, sheath 52 augments the forward bias of spar 40 to enhance the forward bias of proprotor blade assembly 28. As illustrated, foam filler 54 is disposed spanwise between spar 40 and sheath 52. Foam filler 54 is sized and shaped to support sheath 52 at the proper position relative to spar 40. Foam filler 54 may include one or more lead tuning weights, such as tip tuning weight 58 and mid span tuning weight 60. It should be noted that in certain embodiments, foam filler 54 may be omitted leaving a gap between sheath 52 and spar 40. Abrasion resistant strip 56 is disposed spanwise on the leading edge of sheath 52 and is securely attached thereto using adhesive or other suitable coupling technique. Abrasion resistant strip 56 may be formed from a metal such as stainless steel and is designed to protect the other components of proprotor blade assembly 28 from erosion and impacts.

Upper skin 62, wedge member 64, core 66 and lower skin 68 form the afterbody of proprotor blade assembly 28. Upper skin 62 and lower skin 68 are preferably monolithic structures formed using a broad goods and/or layered tape construction process having a manual or automated layup of a plurality of composite broad goods material layers such as fiberglass fabric, carbon fabric, fiberglass tape, carbon tape and combinations thereof. After curing, the material layers form high strength, lightweight solid composite members. Upper skin 62 and lower skin 68 serve as structural members of proprotor blade assembly 28 and are securely attached spanwise to spar 40 using adhesive, curing or other suitable coupling technique. Core 66 may be in the form of a nomex honeycomb structure disposed spanwise along trailing edge 50 of spar 40. Core 66 provides stability, compression resistance and shear transfer between upper skin 62 and lower skin 68. Wedge member 64 forms the trailing edge of proprotor blade assembly 28. Wedge member 64 is preferably a monolithic structure formed using a broad goods and/or layered tape construction process having a manual or automated layup of a plurality of composite broad goods material layers such as fiberglass fabric, carbon fabric, fiberglass tape, carbon tape and combinations thereof. After curing, the material layers form a high strength, lightweight solid composite member. Wedge member 64 serves as a structural member of proprotor blade assembly 28 including providing stiffness to proprotor blade assembly 28. Also shown in FIGS. 3 and 5, proprotor blade assembly 28 includes a pitch horn 70. Pitch horn 70 is preferably formed from metal such as machined aluminum. In the illustrated embodiment, pitch horn 70 is securably coupled to spar 40 with a plurality of bolts. In operation, pitch horn 70 is connected to the control system of tiltrotor aircraft 10 enabling the pilot to selectively control the pitch of proprotor blade assembly 28.

Figure 6:
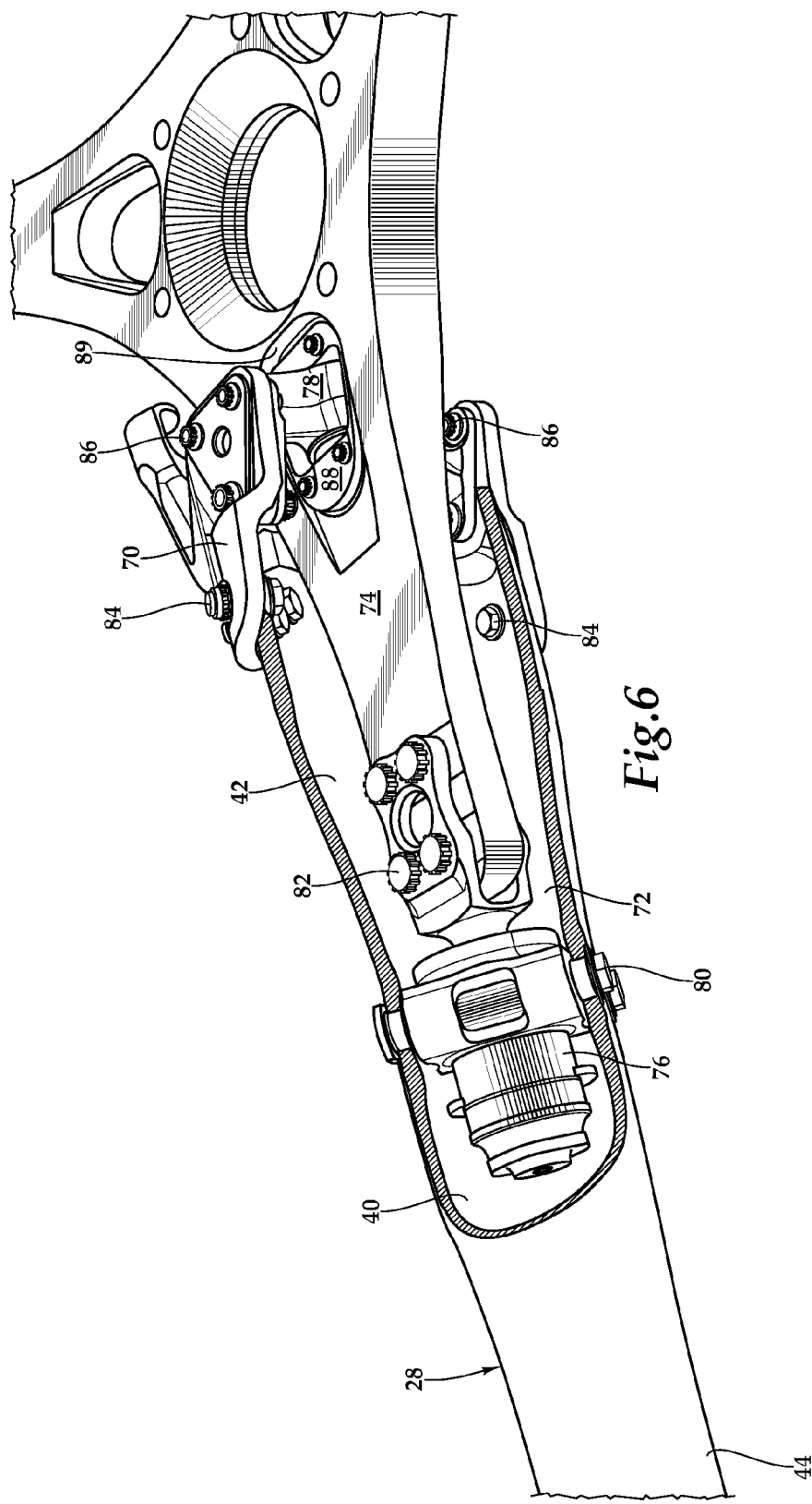
FIG. 6 is a cross sectional view of the root section of a proprotor blade assembly coupled to a yoke in accordance with embodiments of the present disclosure.

Referring to FIG. 6 in the drawings, root section 42 of proprotor blade assembly 28 is depicted. In the illustrated embodiment, root section 42 of spar 40 forms an integral cuff 72 that enables spar 40 to be coupled with a yoke 74 via a bearing assembly 76 and beam assembly 78. Integral cuff 72 is preferably a monolithic structure together with root section 42 and main section 44 of spar 40 and is formed together with root section 42 and main section 44 of spar 40. As illustrated, spar 40 is coupled to bearing assembly 76 with a pair of connecting members depicted as pins 80 that extend through upper and lower surfaces of spar 40. Bearing assembly 76 is coupled to yoke 74 with a plurality of connecting members depicted as bolts 82. Spar 40 has a primary centrifugal force retention load path through integral cuff 72 via bearing assembly 76 to yoke 74. In addition, spar 40 is coupled to beam assembly 78 via pitch horn 70 with a first plurality of connecting members depicted as bolts 84 and a second plurality of connecting members depicted as bolts 86. Beam assembly 78 is rotatably mounted within a support structure 88 that is securably positioned with an opening 89 of yoke 74, thereby allowing proprotor blade assembly 28 to pivot relative to yoke 74 as the pitch of proprotor blade assembly 28 is adjusted during takeoff and flight operations. Spar 40 has a secondary centrifugal force retention load path through integral cuff 72 via beam assembly 78 to yoke 74. In this manner, spar 40 has redundant centrifugal force retention load paths through integral cuff 72 via bearing assembly 76 and beam assembly 78 to yoke 74. In operation, yoke 74 is coupled to the engine and transmission via the drive shaft, thereby providing torque and rotational energy to rotate proprotor blade assembly 28.

Referring now to FIGS. 7A-7C in the drawings, spar 40 is depicted in multiple views. Spar 40 is the main structural member designed to carry the primary centrifugal and bending loads of proprotor blade assembly 28. As best seen in FIG. 7A, spar 40 has a root section 42, a main section 44, a tip section 46, a leading edge 48 and a trailing edge 50. Spar 40 is designed to have simple geometry that enables a broad goods construction process and preferably a broad goods construction process including a single layup and single cure. For example, leading edge 48 of spar 40 may be formed as a single linear section 90. Similarly, trailing edge 50 of spar 40 may be formed as three sections 92, 94, 96 wherein sections 92, 96 are linear sections and section 94 is an arc length section of a large radius circle, such as a circle having a radius of one thousand inches or more. The use of simple geometric surfaces including linear surfaces, large radius arc length surfaces and/or near-ruled surfaces as well as smooth transitions therebetween improves the manufacturability of spar 40 allowing for an entirely automated broad goods layup or the combination of an automated and a manual broad goods layup. Alternatively, the broad goods layup could be performed using an entirely manual process. Use of broad goods and particularly a single automated broad goods layup and single cure, not only enhances spar producibility and quality due to the reduced complexity of the manufacturing process, but also results in lower production costs, more efficient material usage, reduced labor hours and reduced energy consumption. Even though leading edge 48 and trailing edge 50 of spar 40 have been depicted and described as having a particular number of sections in a particular geometric arrangement, it should be understood by those skilled in the art that a leading edge and/or a trailing edge of a spar according to the present disclosure could alternatively have different numbers of sections with different geometric arrangements.

As best seen in FIG. 7B, spar 40 is designed with a spanwise taper. For example, the thickness of the spar wall is greatest in root section 42 of spar 40 where spar 40 experiences the greatest centrifugal loads. Likewise, the thickness of the spar wall is least near tip section 46 of spar 40 where spar 40 experiences significantly lower centrifugal loads. More specifically, the spar wall thickness is greatest at the lower radial stations including, for example, at a radial station 98 of approximately ten percent (10% r/R) located proximate the connection between spar 40 and bearing assembly 76. Outboard from radial station 98, spar gradually tapers in wall thickness such that the spar wall thickness at a radial station 100 of approximately twenty five percent (25% r/R) is less than the spar wall thickness at radial station 98 but greater than the spar wall thickness at a radial station 102 of approximately fifty percent (50% r/R). Likewise, the spar wall thickness at a radial station 104 of approximately seventy five percent (75% r/R) is less than the spar wall thickness at radial station 102 but greater than the spar wall thickness at a radial station 106 of approximately ninety five percent (95% r/R). It should be understood by those skilled in the art that the taper of the spar wall thickness may progress in a linear or non linear manner and may have different contours or slopes in different sections of the spar including sections having no taper. As such, it should be understood by those skilled in the art that the taper of the spar wall thickness will be determined based upon structural and dynamic analysis for the specific implementation.

As best seen in FIG. 7C, spar 40 has a generally oval cross section with a forward structural bias. The illustrated cross section of spar 40 may represent any radial station in main section 44 of spar 40 beginning, for example, at an inboard radial station of approximately twelve percent (12% r/R) and extending to an outboard radial station of approximately ninety eight percent (98% r/R). Additionally, some embodiments of spar 40 may have forward structural bias at radial stations less than twelve percent (12% r/R) and/or greater than ninety eight percent (98% r/R). The forward structural bias of spar 40 achieved by tailoring the material thickness along the forward wall or leading edge 48 to be greater than the material thickness along the aft wall or trailing edge 50. The forward structural bias results in the shear center, the weight and the stiffness of spar 40 being biased forward.

In one non-limiting example, the forward wall or leading edge 48 of spar 40 has a thickness at least 50% greater than the thickness of the aft wall or trailing edge 50 of spar 40. In another non limiting example, the forward wall or leading edge 48 of spar 40 has a thickness between about 50% and about 120% greater than the thickness of the aft wall or trailing edge 50 of spar 40. The magnitude of the forward structural bias of spar 40 may be uniform along all radial stations of main section 44 of spar 40. Alternatively, the magnitude of the forward structural bias of spar 40 may be different at various radial stations of main section 44 of spar 40. As such, it should be understood by those skilled in the art that the magnitude of the forward structural bias of spar 40 and the spanwise profile of the magnitude of the forward structural bias along spar 40 will be determined based upon structural and dynamic analysis for the specific implementation. In addition, even though spar 40 has been depicted and described as having a forward structural bias, it should be understood by those skilled in the art that a spar for use in a proprotor blade assembly could have alternate structural biases including, for example, an aft structural bias, an upper structural bias, a lower structural bias or other similar structural bias.

Figure 8:
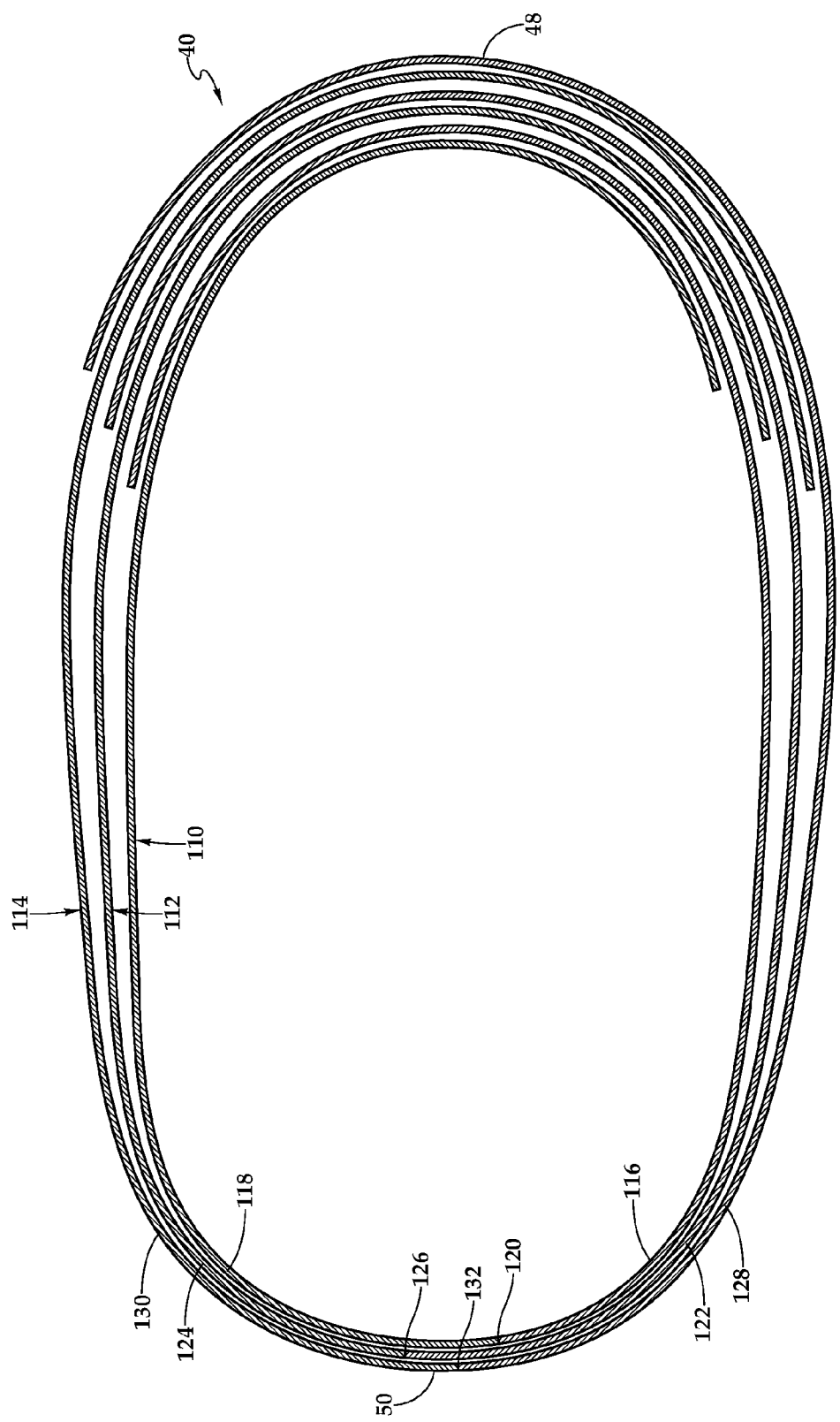
FIG. 8 is a cross sectional view depicting the layup of broad goods used to form a spar for use in a proprotor blade assembly in accordance with embodiments of the present disclosure.

Referring to FIG. 8 in the drawings, a layup of broad goods used to form a spar 40 for use in a proprotor blade assembly 28 is depicted. During the layup process to form spar 40, one or more mandrels are typically used to provide the surfaces for the broad goods layup that, for clarity of illustration, are not shown in FIG. 8. Spar 40 is formed from multiple layers of broad goods that are layup together and cured to form a monolithic structure. Preferably, spar 40 is manufactured using a single layup and single cure protocol. The broad goods for spar 40 may be in the form of fiberglass fabric, carbon fabric, fiberglass tape, carbon tape and combinations thereof, however, other lightweight and high strength materials could alternatively be used. As illustrated in FIG. 8, the board goods layup includes an inner layer 110, a mid layer 112 and an outer layer 114. Inner layer 110 includes broad goods element 116 and broad goods element 118 having ends that are butt-spliced together at 120. Broad goods element 116 and broad goods element 118 each extend approximately 240 degrees around the mandrels (not pictured) but in opposite orientations such that broad goods element 116 overlaps with broad goods element 118 for about 120 degrees. Similarly, mid layer 112 includes broad goods element 122 and broad goods element 124 having ends that are butt-spliced together at 126. Broad goods element 122 and broad goods element 124 each extend approximately 240 degrees around the mandrels (not pictured) and inner layer 110 but in opposite orientations such that broad goods element 122 overlaps with broad goods element 124 for about 120 degrees. Additionally, outer layer 114 includes broad goods element 128 and broad goods element 130 having ends that are butt-spliced together at 132. Broad goods element 128 and broad goods element 130 each extend approximately 240 degrees around the mandrels (not pictured), inner layer 110 and mid layer 112 but in opposite orientations such that broad goods element 128 overlaps with broad goods element 130 for about 120 degrees.

It should be noted that gaps have been shown between inner layer 110, mid layer 112 and outer layer 114 as well as between the overlapping portions of inner layer 110, mid layer 112 and outer layer 114 for the purpose of clarity of illustration. It will be understood by those skilled in the art that in the actual layup, adjacent broad goods layers and broad goods elements would be in contract with each other. In addition, even though FIG. 8 has depicted three broad goods layers forming spar 40, it should be understood by those skilled in the art that the actual layup could include any number broad goods layers. Also, even though FIG. 8 has depicted various broad goods layers extend approximately 240 degrees around the mandrels, it should be understood by those skilled in the art that the actual layup different layers may extend different arc distances around the mandrels including, for example, in the range between about 180 degrees and about 290 degrees or other greater or lesser arc distances. Further, in an actual layup, additional structural members may be interleaved between these torque wrapped broad good layers, including, for example, centrifugal force carrying structural members located on the upper and lower surfaces of spar 40.

In the illustrated example, the aft wall or trailing edge 50 of spar 40 has a thickness equivalent to that of three layers of broad goods as the broad goods elements in each layer 110, 112, 114 have been butt-spliced together in a staggered arrangement. The forward wall or leading edge 48 of spar 40 has a thickness equivalent to that of six layers of broad goods as the broad goods elements in each layer 110, 112, 114 have an overlapping relationship. In this example, once broad goods layers 110, 112, 114 are cured, the forward wall or leading edge 48 of spar 40 will have a thickness that is about 100% greater than the thickness of the aft wall or trailing edge 50 of spar 40. In this manner, spar 40 is designed with a forward structural bias.

Even though FIG. 8 has depicted a particular broad goods layup process to achieve a forward structural bias for a spar, it should be understood by those skilled in the art that the broad goods layup process may take many forms both similar to or different from the example presented. For example, even though FIG. 8 has depicted and described the broad goods elements of each broad goods layer as overlapping by approximately 120 degrees, it is to be understood by those skilled in the art that the broad goods elements of each broad goods layer could overlap by other amounts both less than or greater than 120 degrees. Alternatively or additionally, material thickness can be selectively tailored by placing additional layers of broad goods or other materials in desired locations about the circumference of the spar layup to achieve a desired structural bias for a spar. In addition, other manufacturing processes not including broad goods could alternatively be used to achieve a desired structural bias for a spar.

While this disclosure has been described with reference to illustrative embodiments, this description is not intended to be construed in a limiting sense. Various modifications and combinations of the illustrative embodiments as well as other embodiments will be apparent to persons skilled in the art upon reference to the description. It is, therefore, intended that the appended claims encompass any such modifications or embodiments.

What is claimed is:

1. A proprotor blade assembly comprising:
a spar having a root section, a main section and a tip section, the spar having a generally oval cross section at radial stations along the main section, the spar having a first edge and a generally oppositely disposed second edge, the first edge having a structural bias relative to the second edge at the radial stations along the main section, the wall thickness of the first edge and the wall thickness of the second edge each having a decreasing spanwise taper as the radial station increases along the main section; and
a sheath extending spanwise along a leading edge of the spar.

2. The proprotor blade assembly as recited in claim 1 wherein the first edge of the spar further comprises the leading edge of the spar.

3. The proprotor blade assembly as recited in claim 1 wherein the thickness of the first edge of the spar is greater than the thickness of the second edge of the spar at the radial stations along the main section of the spar.

4. The proprotor blade assembly as recited in claim 1 wherein the thickness of the first edge of the spar is at least 50% greater than the thickness of the second edge of the spar at the radial stations along the main section of the spar.

5. The proprotor blade assembly as recited in claim 1 wherein the thickness of the first edge of the spar is between about 50% and about 120% greater than the thickness of the second edge of the spar at the radial stations along the main section of the spar.

6. The proprotor blade assembly as recited in claim 1 wherein the first edge of the spar further comprises a cured laminate of overlapping broad goods layers.

7. The proprotor blade assembly as recited in claim 6 wherein the overlapping broad goods layers extend between about 180 degrees and about 290 degrees around the spar.

8. The proprotor blade assembly as recited in claim 1 wherein the second edge of the spar further comprises a cured laminate of butt-spliced broad goods layers.

9. The proprotor blade assembly as recited in claim 1 wherein the second edge of the spar further comprises a cured laminate of staggered butt-spliced broad goods layers.

10. The proprotor blade assembly as recited in claim 1 wherein the spar further comprises a monolithic structure formed by curing a plurality of composite broad goods material layers.

11. The proprotor blade assembly as recited in claim 10 wherein the plurality of composite broad goods material layers is selected from the group consisting of fiberglass fabric, carbon fabric, fiberglass tape, carbon tape and combinations thereof.

12. The proprotor blade assembly as recited in claim 1 wherein the spar further comprises simple geometric surfaces with smooth transitions.

13. The proprotor blade assembly as recited in claim 1 wherein the sheath extends along the full span of the spar.

14. The proprotor blade assembly as recited in claim 1 wherein the sheath further comprises a structural member of the proprotor blade assembly.

15. The proprotor blade assembly as recited in claim 1 further comprising a filler assembly disposed between the spar and the sheath.

16. The proprotor blade assembly as recited in claim 1 further comprising an upper skin and a lower skin each extending spanwise along the spar forming upper and lower surfaces of the proprotor blade assembly.

17. The proprotor blade assembly as recited in claim 1 wherein the root section of the spar further comprises an integral cuff.

18. The proprotor blade assembly as recited in claim 17 wherein the spar has redundant centrifugal force retention load paths through the integral cuff.

19. A rotorcraft, comprising:
a fuselage;
a wing member extending from the fuselage;
an engine disposed relative to the wing member; and
a proprotor mechanically coupled to the engine, the proprotor including a plurality of proprotor blade assemblies each comprising:
a spar having a root section, a main section and a tip section, the spar having a generally oval cross section at radial stations along the main section, the spar having a first edge and a generally oppositely disposed second edge, the first edge having a structural bias relative to the second edge at the radial stations along the main section, the wall thickness of the first edge and the wall thickness of the second edge each having a decreasing spanwise taper as the radial station increases along the main section; and
a sheath extending spanwise along a leading edge of the spar.

20. The rotorcraft as recited in claim 19 wherein the engine is rotatably mounted relative to the wing member.

* * * * *